(12) United States Patent
Ichikawa

(10) Patent No.: US 11,640,502 B2
(45) Date of Patent: May 2, 2023

(54) WORD REGISTRATION DEVICE, WORD REGISTRATION METHOD, AND WORD REGISTRATION PROGRAM STORED ON COMPUTER-READABLE STORAGE

(71) Applicant: OMRON Corporation, Kyoto (JP)

(72) Inventor: Kei Ichikawa, Ibaraki (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/174,368

(22) Filed: Feb. 12, 2021

(65) Prior Publication Data

US 2021/0279415 A1    Sep. 9, 2021

(30) Foreign Application Priority Data

Mar. 9, 2020  (JP) .............................. JP2020-039807

(51) Int. Cl.
  *G06F 40/242*    (2020.01)
  *G06F 3/0482*    (2013.01)
  *G06F 40/211*    (2020.01)

(52) U.S. Cl.
  CPC .......... *G06F 40/242* (2020.01); *G06F 3/0482* (2013.01); *G06F 40/211* (2020.01)

(58) Field of Classification Search
  CPC .... G06F 40/242; G06F 3/0482; G06F 40/211; G06F 3/04886
  See application file for complete search history.

(56) References Cited

U.S. PATENT DOCUMENTS

| | | | | |
|---|---|---|---|---|
| 9,342,233 | B1* | 5/2016 | Dimson | G06F 3/0488 |
| 2006/0230346 | A1* | 10/2006 | Bhogal | G06F 40/169 |
| | | | | 715/205 |
| 2009/0254817 | A1* | 10/2009 | Dreyfus | G06F 40/242 |
| | | | | 715/257 |
| 2011/0041052 | A1* | 2/2011 | Fraisl | G06F 40/10 |
| | | | | 715/234 |
| 2013/0149689 | A1* | 6/2013 | DeGross | G09B 7/00 |
| | | | | 434/362 |
| 2013/0275120 | A1* | 10/2013 | DeGross | G06F 40/40 |
| | | | | 704/9 |
| 2017/0220536 | A1* | 8/2017 | Chiba | G06F 40/232 |
| 2017/0270104 | A1* | 9/2017 | Alshikh | G06F 40/51 |
| 2018/0067920 | A1* | 3/2018 | Cho | G06F 40/242 |
| 2020/0285324 | A1* | 9/2020 | Akimoto | G06F 40/30 |

FOREIGN PATENT DOCUMENTS

JP           2006-155529 A       6/2006

* cited by examiner

*Primary Examiner* — Hien L Duong
(74) *Attorney, Agent, or Firm* — Metrolex IP Law Group, PLLC

(57) ABSTRACT

A character string selection detector may detect selection of a character string appearing on a screen of a display in accordance with an application program. The selection may be performed with an operation with an input device. A registration screen controller may cause a word registration screen for registering, to a dictionary, the character string selected and detected by the character string selection detector to appear on the display in response to a registration operation detector detecting a registration operation. A word registration unit may register, to the dictionary, a word in accordance with data appearing on the word registration screen in response to an enter operation detector detecting an enter operation.

9 Claims, 5 Drawing Sheets

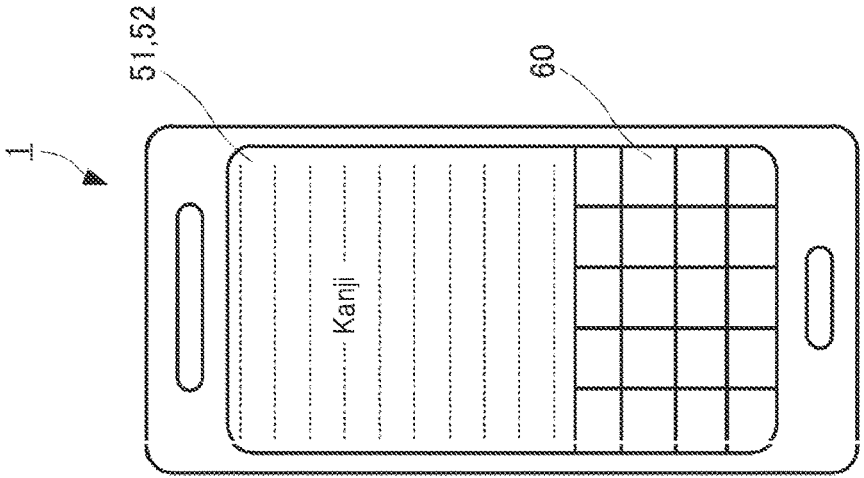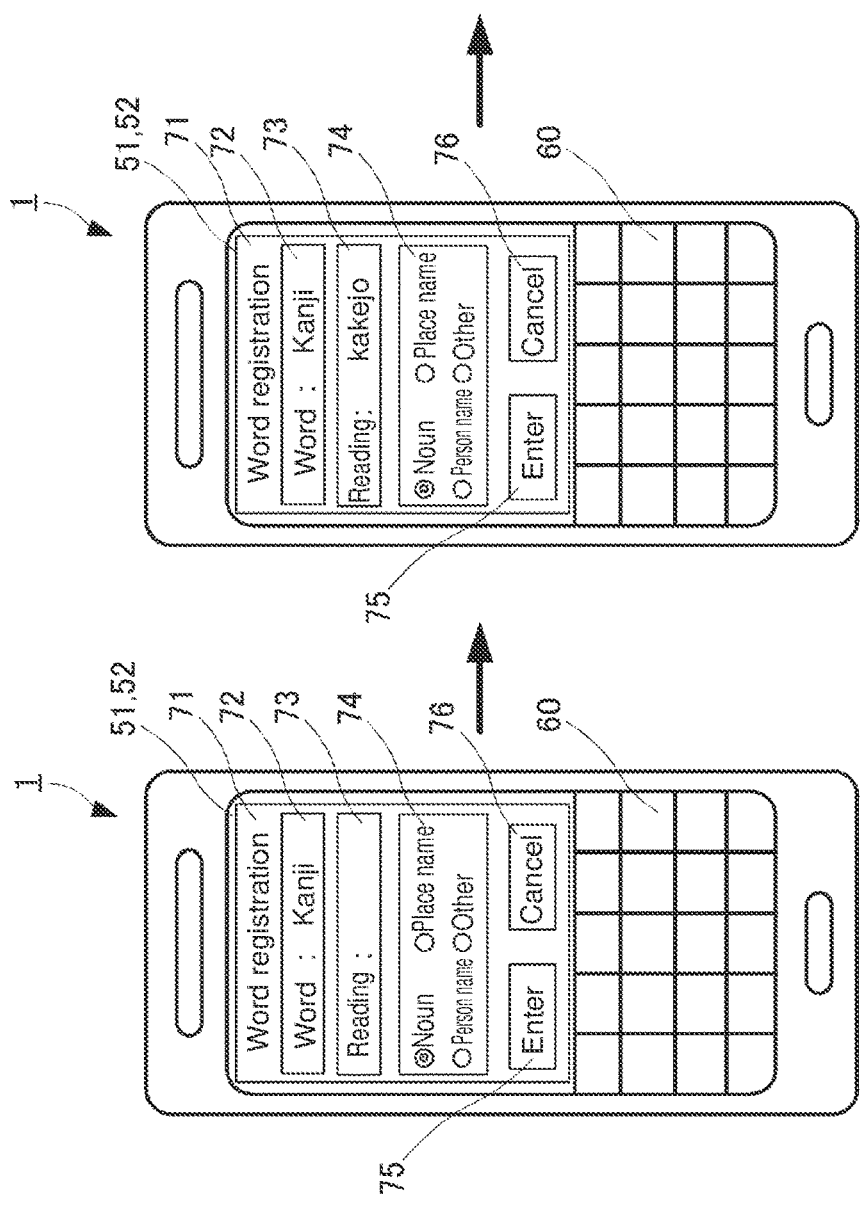

WORD REGISTRATION DEVICE, WORD REGISTRATION METHOD, AND WORD REGISTRATION PROGRAM STORED ON COMPUTER-READABLE STORAGE

CROSS-REFERENCE TO RELATED APPLICATION

This application claims priority to Japanese Patent Application No. 2020-039807 filed on Mar. 9, 2020, the contents of which are incorporated herein by reference.

FIELD

The disclosure relates to a technique for registering any character string as a word to a dictionary usable on, for example, a character input device.

BACKGROUND

A electronic device is known that can receive a character input can register any character string as a word to a dictionary usable for character input to allow a user to input characters efficiently. Any character string to be registered to the dictionary is hereafter referred to as an additional word.

Japanese Unexamined Patent Application Publication No. 2006-155529 ("Patent Literature 1') describes a structure for registering an additional word and any other word relevant to the word at a time.

SUMMARY

A user registers an additional word to the dictionary by performing the operations (1) to (6) below:

(1) Selecting a character string of an additional word on, for example, a document file or a web page appearing in accordance with an application program;

(2) Copying the selected character string of the additional word to a clipboard.

(3) Performing an input operation to display a word registration screen;

(4) Inputting the reading for the additional word in an additional word reading input field on the word registration screen;

(5) Selecting a part of speech for the additional word in a speech part selection field on the word registration screen; and (6) Entering the registration of the additional word in the dictionary.

The character string of the additional word copied to the clipboard with the operation (2) is automatically input into an additional word input field on the word registration screen appearing with the operation (4) (eliminating the operation for pasting the character string of the additional word copied to the clipboard with the operation (2) into the additional word input field on the word registration screen).

As described above, registering an additional word to the dictionary can be troublesome.

A word registration device according to one or more embodiments may be directed to a technique for simplifying the operation for registering any character string as a word to a dictionary and improving user operability.

A word registration device according to one or more embodiments may have the structure described below.

A character string selection detector may detect selection of a character string appearing on a screen of a display in accordance with an application program. The selection may be performed with an operation with an input device. The input device may be, for example, a touchscreen panel attached to the screen of the display, or may be of another type such as a mouse or a keyboard. The character string herein may include one character or two or more characters that are sequential in the direction of writing.

A registration operation detector may detect a registration operation performed with the input device. A registration screen controller may cause a word registration screen for registering, to a dictionary, the character string selected and detected by the character string selection detector to appear on the display in response to the registration operation detector detecting the registration operation. An enter operation detector may detect an enter operation performed with the input device on the word registration screen caused to appear on the display by the registration screen controller. A word registration unit may register, to the dictionary, a word in accordance with data appearing on the word registration screen in response to the enter operation detector detecting the enter operation.

The above described structure may allow a user to register the selected character string as a word to the dictionary (allows the operations (2) and (3) above to be performed in a single operation), without performing the operation (2) above (copying the selected character string of the additional word to the clipboard). The above described structure thus may simplify the operation for registering any character string as a word to the dictionary and improves user operability.

In one or more embodiments, the registration operation detector may cause a request button for determining whether a word registration is to be performed to appear on the screen of the display in response to the character string selection detector detecting selection of the character string, and detect an input operation on the request button performed with the input device as the registration operation.

The above described structure may allow smooth shifting to the operation for registering the selected character string as a word to the dictionary, thus further improving operability.

In another example, the registration screen controller may cause the word registration screen containing the character string selected and detected by the character string selection detector and a reading for the character string to appear on the display.

The above described structure may allow the user to register the selected character string as a word to the dictionary without performing the operation (4) above (inputting the reading for the additional word in the additional word reading input field on the word registration screen). The above described structure thus may further simplify the operation for registering any character string as a word to the dictionary, thus further improving user operability.

The technique according to one or more embodiments may simplify the operation for registering any character string as a word to a dictionary and improves user operability.

BRIEF DESCRIPTION OF THE DRAWINGS

FIGS. 2A, 2B, and 2C are diagrams illustrating a change of screens on a display for registering any character string as a word to a dictionary;

DETAILED DESCRIPTION

A word registration device according to one or more embodiments is described.

1. Example Use

In one or more embodiments described below, the word registration device is used for a mobile terminal 1, such as a smartphone and a tablet terminal. FIGS. 1A, 1B, 1C, 2A, 2B, and 2C are diagrams showing the change of the screens on a display for registering any character string as a word to a dictionary. In the illustrated example or examples, the screen on the display changes from FIG. 1A, FIG. 1B, FIG. 1C, FIG. 2A, FIG. 2B, and to FIG. 2C, including in the illustrated order. The mobile terminal 1 includes a touchscreen panel 52 attached to the screen of a display 51. The mobile terminal 1 detects a user input operation on its body by detecting a pressed position on the touchscreen panel 52.

Figure 1A:
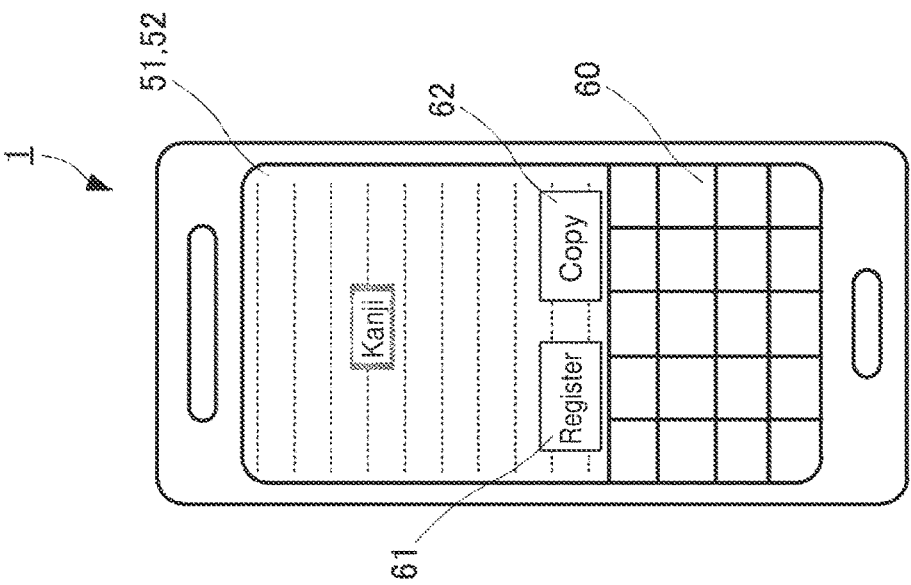
FIGS. 1A, 1B, and 1C are diagrams illustrating the change of the screens on a display for registering any character string as a word to a dictionary.

As shown in FIG. 1A, the mobile terminal 1 can display a document in, for example, a document file or a web page on the screen of the display 51 in accordance with an application program. Although FIGS. 1A to 1C and 2A to 2C show character keys 60 for character input appearing on the screen of the display 51, the character keys 60 may not appear constantly, and may appear in response to a character input from a user.

Figure 1B:
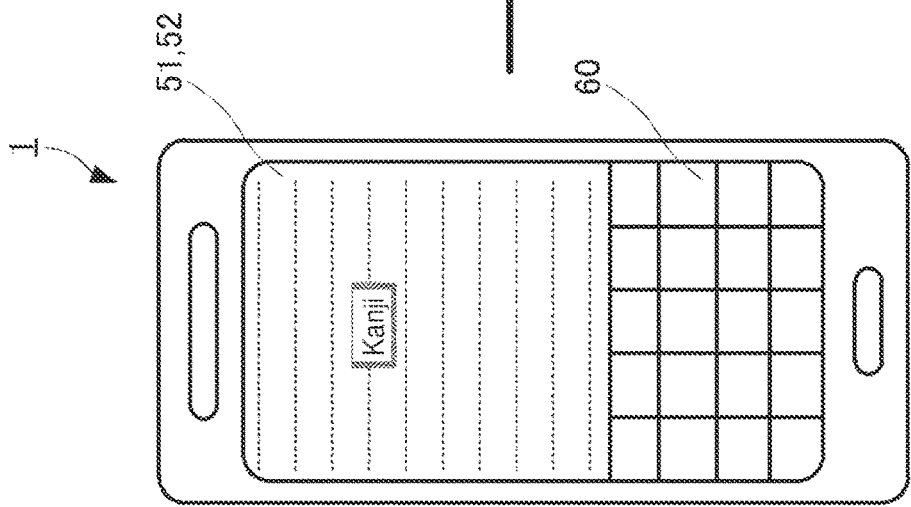

A user selects any character string included in the document appearing in FIG. 1A (Kanji with the reading, kakejo in the present example) to register the character string. FIG. 1B shows the character string Kanji being selected.

Kanji is a coined word meaning rushing onto a train. A character string herein includes one character or two or more characters that are sequential in the direction of writing.

Figure 1C:
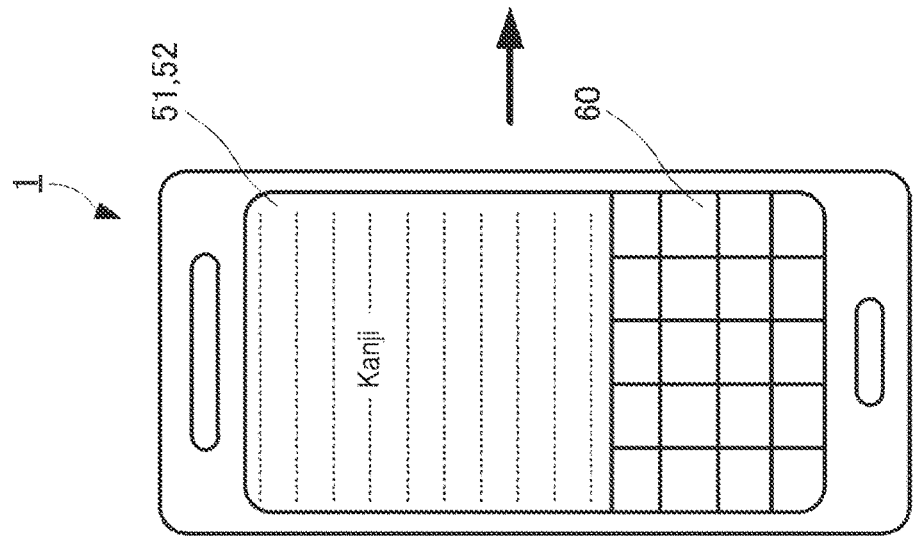

In response to detection of the appearing character string being selected, the mobile terminal 1 displays a register button 61 and a copy button 62 on the screen of the display 51 as shown in FIG. 1C. The register button 61 is operable to register the character string currently being selected to a dictionary. The copy button 62 is operable to store the character string currently being selected onto a clipboard. In response to detection of a user operation on the copy button 62, the mobile terminal 1 stores the character string currently being selected onto the clipboard and returns to the state in FIG. 1A.

The mobile terminal 1 may not display the copy button 62 on the screen of the display 51.

In response to detection of a user operation on the register button 61, the mobile terminal 1 stores the character string currently being selected onto the clipboard and displays a word registration screen 71 on the screen of the display 51 as shown in FIG. 2A. The register button 61 may correspond to a request button in one or more embodiments.

The word registration screen 71 includes a word input field 72, a reading input field 73, a speech part selection field 74, an enter button 75, and a cancel button 76. In response to detection of an operation on the register button 61, the mobile terminal 1 displays, on the screen of the display 51, the word registration screen 71 with the word input field 72 containing the character string most recently stored onto the clipboard. In other words, the mobile terminal 1 inputs the character string most recently selected by the user in the word input field 72 without the user inputting the character string in the word input field 72 on the word registration screen 71. The above described structure eliminates the user operation for inputting the character string in the word input field 72 on the word registration screen 71.

In response to detection of an operation on the register button 61, the mobile terminal 1 may display, on the screen of the display 51, the word registration screen 71 with the word input field 72 containing no character string. In the present case, the user may input any characters other than the selected character(s) or input the character string stored on the clipboard (the character string currently being selected) by pasting the character string into the word input field 72. The word registration screen can thus appear in a simplified manner. The above described structure effectively reduces the workload on the user displaying the word registration screen with a typically troublesome operation.

The user inputs the reading for the character string to be registered to the dictionary (the character string input in the word input field 72) into the reading input field 73, and performs an input operation for selecting a part of speech for the character string to be registered to the dictionary in the speech part selection field 74. The user may determine the reading and the part of speech for the character string to be registered to the dictionary in any manner. For example, the reading for Kanji in the above described example may be kakejo, kakekomijosha, kakekomi, or any other reading. The user may select the part of speech from parts of speech including noun and verb as appropriate. FIG. 2B shows a screen including the reading input field 73 in which the user has input the reading for the character string to be registered to the dictionary, and the speech part selection field 74 in which the user has selected the part of speech for the character string to be registered to the dictionary.

In response to detection of an operation on the enter button 75, the mobile terminal 1 registers a word to the dictionary in accordance with data currently input in the word input field 72, the reading input field 73, and the speech part selection field 74 on the word registration screen 71. More specifically, the mobile terminal 1 registers the character string input in the word input field 72 to the dictionary in a manner associated with the reading input in the reading input field 73 and the part of speech selected in the speech part selection field 74.

In response to detection of an operation on the cancel button 76 on the screen shown in FIG. 2A or 2B appearing on the display 51, the mobile terminal 1 stops registering the word and returns to the screen in FIG. 1A.

In the above described manner, the mobile terminal 1 allows the user to copy a character string to be registered to the dictionary to the clipboard and display the word registration screen 71 on the display 51 in a single operation (operation on the register button 61). In response to the user selecting a character string appearing on the screen of the display 51, the register button 61 appears on the display 51. The user can thus smoothly shift to word registration for registering the currently selected character string to the dictionary. The mobile terminal 1 can thus simplify the operation for word registration and improve user operability.

2. Example Configuration

Figure 3:
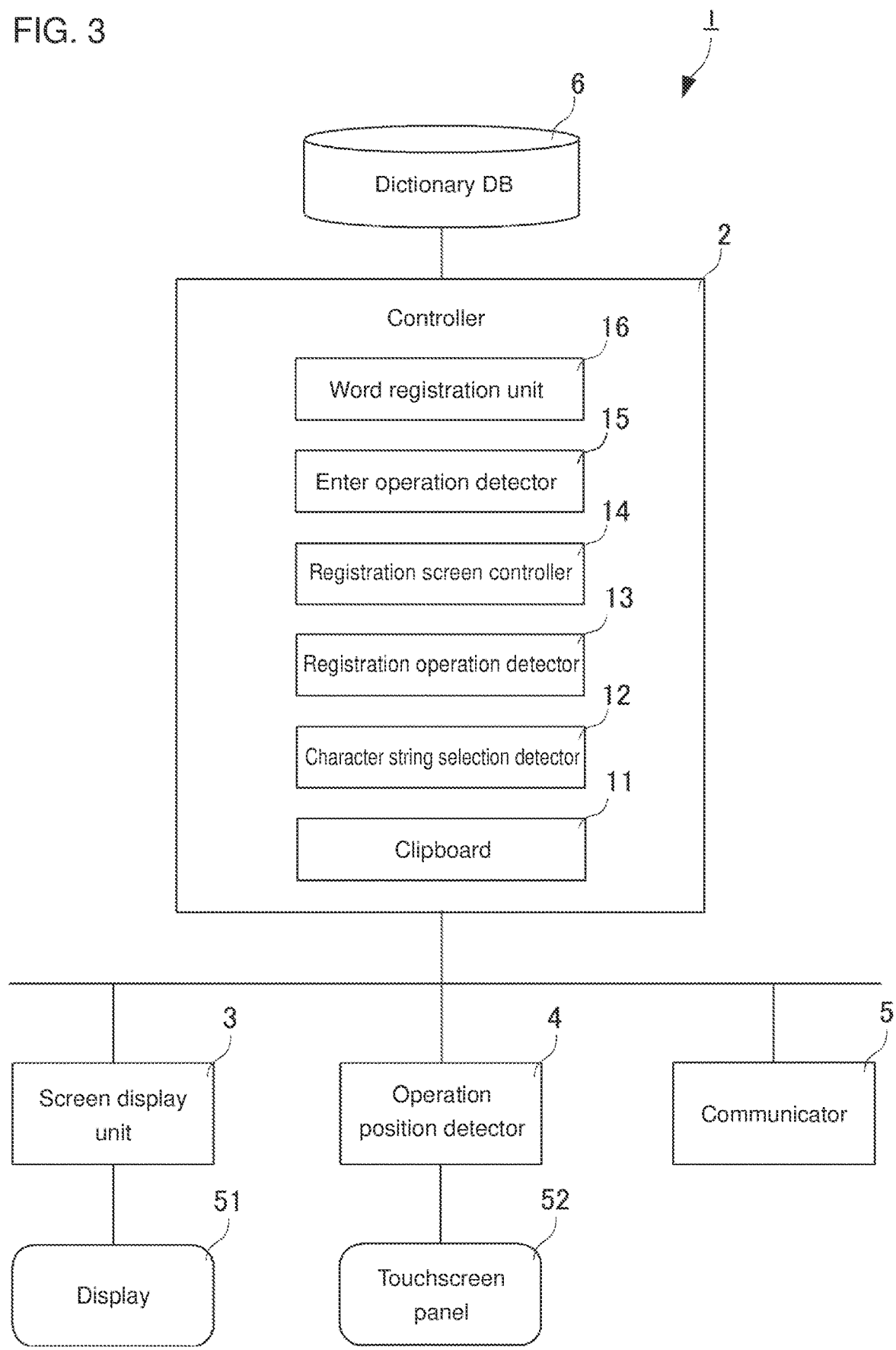
FIG. 3 is a block diagram illustrating a mobile terminal including a word registration device in one or more embodiments showing main components thereof.

FIG. 3 is a block diagram of a mobile terminal including the word registration device in the present embodiment showing its main components. The mobile terminal 1 includes a controller 2, a screen display unit 3, an operation position detector 4, a communicator 5, a dictionary database (DB) 6, the display 51, and the touchscreen panel 52.

The controller 2 controls the operation of each main component of the mobile terminal 1. The controller 2 includes a clipboard 11, a character string selection detector 12, a registration operation detector 13, a registration screen controller 14, an enter operation detector 15, and a word registration unit 16, which all will be described later.

The screen display unit 3 controls the screen display on the display 51 in accordance with an instruction input from the controller 2.

The operation position detector 4 detects a user operation position (pressed position) on the touchscreen panel 52 attached to the screen of the display 51 and outputs the detection result to the controller 2.

The communicator 5 controls communication with devices connected through a network. For example, the communicator 5 performs data communications to obtain a web page from a web server connected through a network. The communicator 5 also performs communications such as voice communications with, for example, another mobile terminal, sending and receiving emails, and communications for a social networking service (SNS).

The dictionary DB 6 stores words each registered in a manner associated with, for example, its character string, reading, and part of speech. The dictionary DB 6 is usable to convert input characters (reading) into their associated character string (converted character string) or predict a converted character string.

The mobile terminal 1 can execute various types of application programs (hereafter simply referred to as an application). For example, the mobile terminal 1 can execute an application for displaying, on the display 51, any web page obtained by accessing a web server, an application for schedule management, and an application for SNS. The mobile terminal 1 uses the dictionary DB 6 for input of characters on an application.

The dictionary DB 6 is incorporated in the mobile terminal 1 in the present embodiment. In some embodiments, the dictionary DB 6 may be placed on a cloud. The dictionary DB 6 may include two dictionaries, or a system dictionary and a user dictionary.

The clipboard 11, the character string selection detector 12, the registration operation detector 13, the registration screen controller 14, the enter operation detector 15, and the word registration unit 16 included in the controller 2 will now be described.

The clipboard 11 is a part of the memory area included in the controller 2 and can be shared among applications.

The character string selection detector 12 detects selection of a character string appearing on the screen of the display 51 in accordance with an application.

In response to the character string selection detector 12 detecting selection of the character string appearing on the screen of the display 51 in accordance with an application, the registration operation detector 13 displays the register button 61 and the copy button 62 on the screen of the display 51 and detects any operation on the register button 61. The registration operation detector 13 also detects any operation on the copy button 62.

The registration screen controller 14 displays the word registration screen 71 on the display 51 and receives user input operations in the word input field 72, the reading input field 73, and the speech part selection field 74.

The enter operation detector 15 detects any operation performed with the enter button 75 or the cancel button 76 on the word registration screen 71 is operated.

The word registration unit 16 registers a character string (word) and information such as its reading and part of speech to the dictionary DB 6 in a manner associated with each other.

The controller 2 may herein correspond to a word registration device in one or more embodiments. More specifically, the word registration device in one or more embodiments may include the character string selection detector 12, the registration operation detector 13, the registration screen controller 14, the enter operation detector 15, and the word registration unit 16.

The controller 2 in the mobile terminal 1 includes a hardware central processing unit (CPU), a memory, and other electronic circuits. The hardware CPU executing a word registration program in one or more embodiments operates as the character string selection detector 12, the registration operation detector 13, the registration screen controller 14, the enter operation detector 15, and the word registration unit 16. The memory has an area for expanding the word registration program in one or more embodiments and an area for temporarily storing data generated by executing the word registration program. The memory also has an area used as the clipboard 11. The controller 2 may be a large-scale integrated circuit (LSI) integrating, for example, a hardware CPU and a memory. The hardware CPU may correspond to a computer that implements a word registration method in one or more embodiments.

Although not specifically shown in FIG. 3, the controller 2 operates as a functional unit for various applications (such as an application for displaying a web page on the display 51, an application for schedule managing, and an application for SNS) in the body of the mobile terminal 1 when the applications are executed.

3. Operation Example

Figure 4:
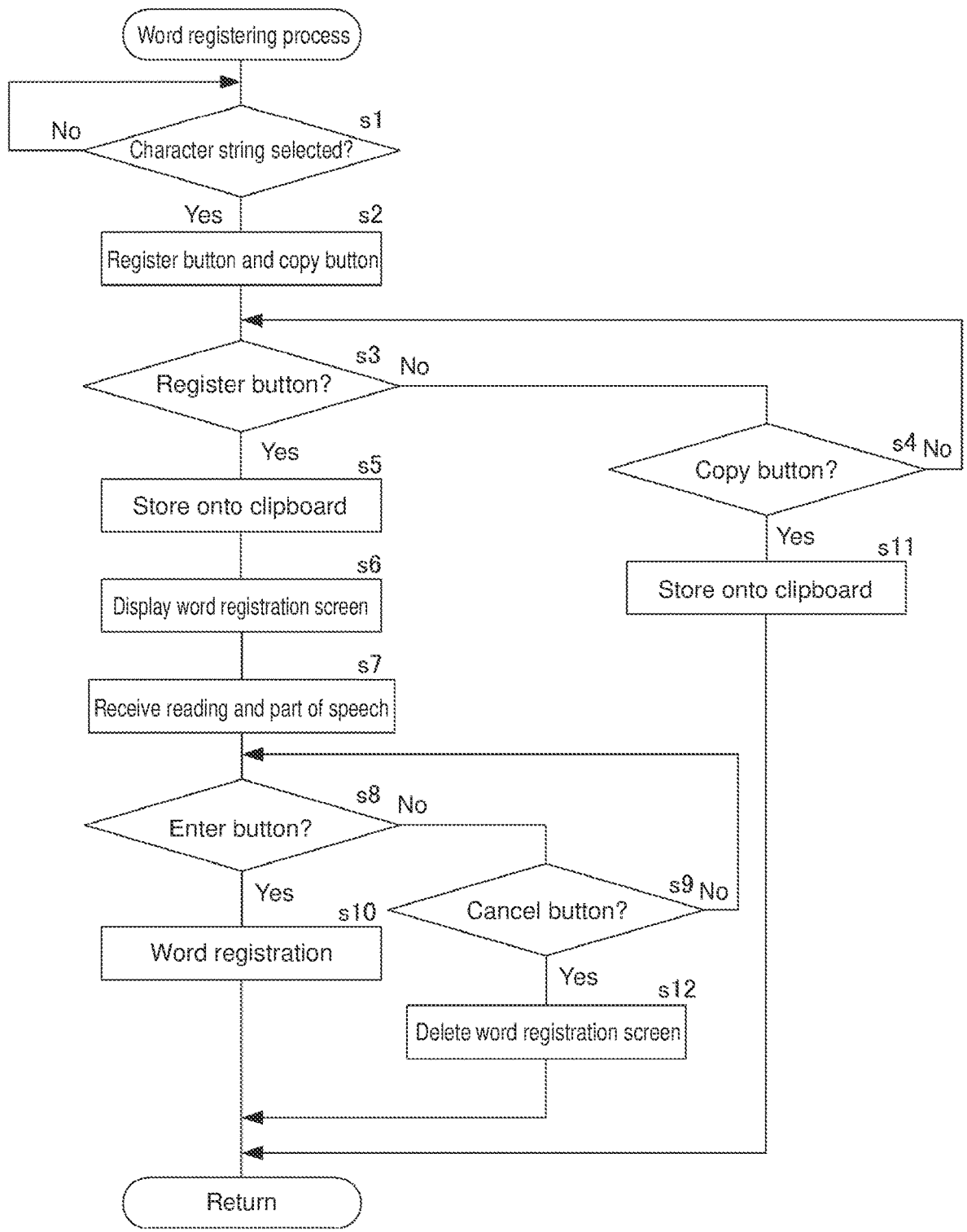
FIG. 4 is a flowchart illustrating a word registering process.

FIG. 4 is a flowchart showing a word registering process. The mobile terminal 1 displays a document in, for example, a document file or a web page on the screen of the display 51 in accordance with an application program.

The character string selection detector 12 detects any user selection of a character string in a document appearing on the screen of the display 51 based on the change in the user operation position on the touchscreen panel 52 detected by the operation position detector 4 (s1). The user may select a character string including one character, or two or more characters sequential in the direction of writing.

In response to the character string selection detector 12 detecting a character string being selected, the registration operation detector 13 causes the register button 61 and the copy button 62 to appear on the screen of the display 51 (s2). In s2, the registration operation detector 13 instructs the screen display unit 3 to display the register button 61 and the copy button 62 on the screen of the display 51. The registration operation detector 13 waits until the register button 61 or the copy button 62 is operated (s3, s4). The registration operation detector 13 determines whether the user operates the register button 61 or the copy button 62 based on the user operation position on the touchscreen panel 52 detected by the operation position detector 4.

In response to detection of a user operation on the copy button 62, the registration operation detector 13 stores, onto the clipboard 11, the character string detected as currently being selected (s11), and returns to s1. In the above described case, the registration operation detector 13 instructs the screen display unit 3 to delete the register button 61 and the copy button 62 on the screen of the display 51.

In response to detection of a user operation on the register button 61, the registration operation detector 13 stores, onto the clipboard 11, the character string detected as currently being selected (s5). The registration screen controller 14 displays the word registration screen 71 on the screen of the display 51 (s6). In s6, the registration screen controller 14 instructs the screen display unit 3 to display the word registration screen 71 on the screen of the display 51.

The word registration screen 71 appearing on the screen of the display 51 in s6 includes the word input field 72 containing the character string selected and detected in s1 for registration as a word in the dictionary DB 6. The reading input field 73 is blank. The speech part selection field 74 contains a part of speech set as the default (e.g., noun) being selected.

The enter operation detector 15 receives user inputs in the word input field 72, the reading input field 73, and the speech part selection field 74 on the word registration screen 71 (s7). In s7, the user can correct and change the character string input in the word input field 72. The enter operation detector 15 waits until the user operates the enter button 75 or the cancel button 76 on the word registration screen 71 (s8, s9). The enter operation detector 15 determines whether the user operates the enter button 75 or the cancel button 76 based on the user operation position on the touchscreen panel 52 detected by the operation position detector 4.

In response to detecting a user operation on the cancel button 76, the enter operation detector 15 instructs the screen display unit 3 to delete the word registration screen 71 appearing on the screen of the display 51 (s12), and returns to s1.

In response to the enter operation detector 15 detecting a user operation on the enter button 75, the word registration unit 16 registers a word to the dictionary DB 6 in accordance with data currently input in the word input field 72, the reading input field 73, and the speech part selection field 74 on the word registration screen 71 (s10), and returns to s1. More specifically, the word registration unit 16 registers the character string input in the word input field 72 to the dictionary DB 6 in a manner associated with the reading input in the reading input field 73 and the part of speech input in the speech part selection field 74.

In the above described manner, the mobile terminal 1 including the word registration device in one or more embodiments may allow the user to copy a character string to be registered to the dictionary DB 6 to the clipboard 11 and display the word registration screen 71 on the display 51 in a single operation (operation on the register button 61). In the present embodiment, in response to the user selecting a character string appearing on the screen of the display 51, the register button 61 appears on the display 51. The user can thus smoothly shift to word registration for registering the currently selected character string to the dictionary. The mobile terminal 1 can thus simplify the operation for word registration and improve user operability.

4. Modifications

The word registration screen 71 appearing on the screen of the display 51 in s6 may include the reading input field 73 containing the reading for the character string detected as being selected in s1, instead of being blank. More specifically, the registration screen controller 14 may display the word registration screen 71 shown in FIG. 2B, instead of the word registration screen 71 shown in FIG. 2A, on the screen of the display 51 in s6. The above described structure eliminates the user operation for inputting the reading for a word to be registered to the dictionary DB 6 (character string detected as being selected in s1).

In the above described structure, the enter operation detector 15 may receive user inputs in the word input field 72, the reading input field 73, and the speech part selection field 74 on the word registration screen 71 in s7. In other words, the user can correct and change the reading input in the reading input field 73 as well as the character string input in the word input field 72.

Figure 5:
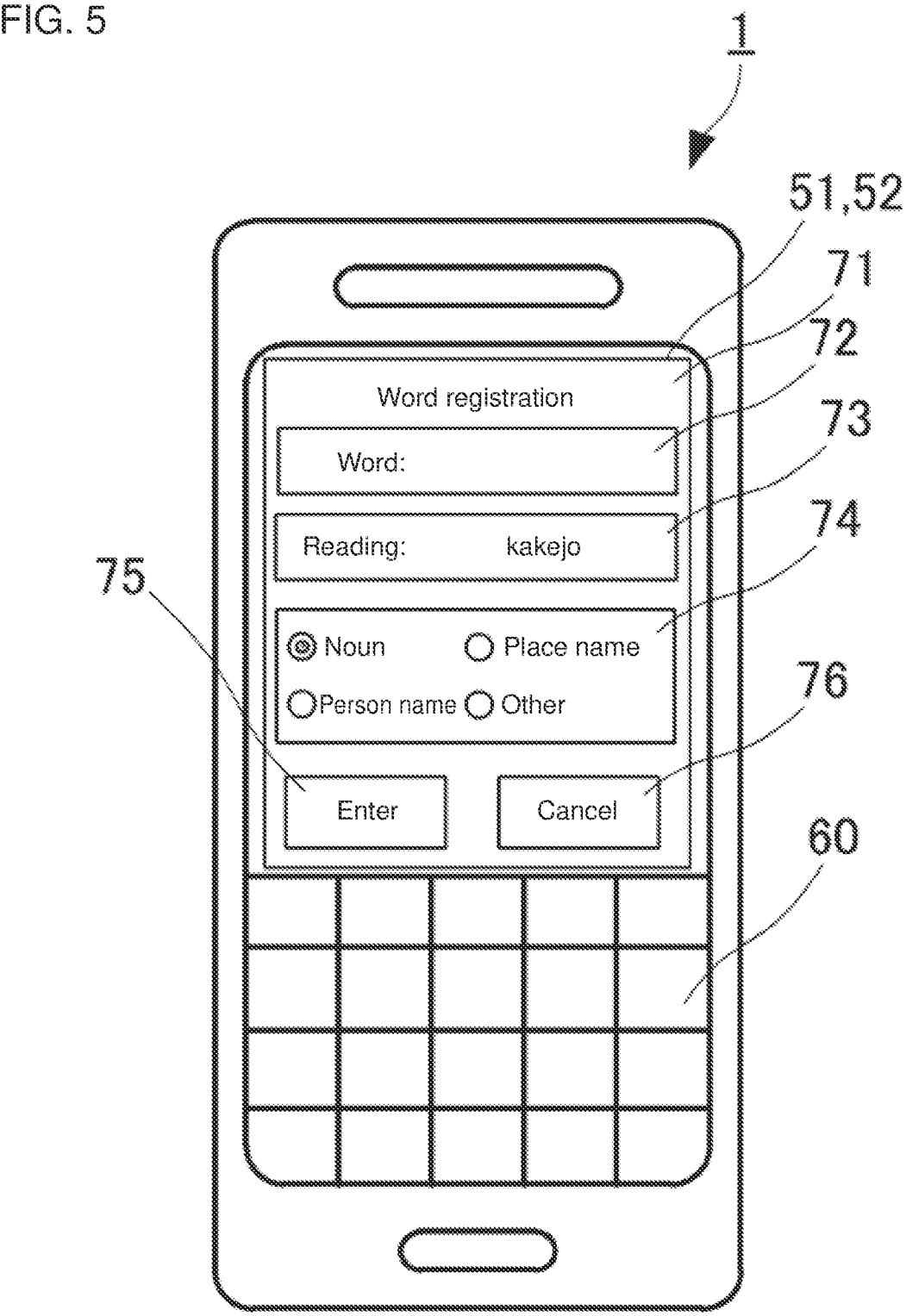
FIG. 5 is a diagram illustrating an example word registration screen according to a modification.

The word registration screen 71 appearing on the screen of the display 51 in s6 may include the word input field 72 being blank and the reading input field 73 containing the reading for the character string detected as being selected in s1 as shown in FIG. 5. The above described structure allows the user who does not know the reading for a character string contained in a document appearing on the screen of the display 51 to easily view the reading by selecting the character string and operating the register button 61 on the screen of the display 51. After viewing the reading, the user may operate the cancel button 76.

The word registration device according to one or more embodiments is also usable for any other information processing device such as a personal computer (PC), in addition to the mobile terminal 1 described above. The input device may be the touchscreen panel 52 in the above embodiments, or may be of another type such as a keyboard or a mouse.

The above described embodiments are exemplary and non-limiting, and the components may be modified without departing from the spirit and scope of the invention in its implementation. The components described in the above embodiments may be combined as appropriate to provide various aspects of the invention. For example, some of the components described in the above embodiments may be eliminated. Further, components in different embodiments may be combined as appropriate.

The correspondence between the structures of the claimed invention and the structures in the above embodiments may be expressed as specified in the appendix below.

APPENDIX

A word registration device may include: a character string selection detector (12) configured to detect selection of a character string appearing on a screen of a display (51) in accordance with an application program, the selection being performed with an operation with an input device (52); a registration operation detector (13) configured to detect a registration operation performed with the input device (52); a registration screen controller (14) configured to cause a word registration screen (71) for registering, to a dictionary (6), the character string selected and detected by the character string selection detector (12) to appear on the display (51) in response to the registration operation detector (13) detecting the registration operation; an enter operation detector (15) configured to detect an enter operation performed with the input device (52) on the word registration screen caused to appear on the display (51) by the registration screen controller (14); and a word registration unit (16) configured to register, to the dictionary (6), a word in accordance with data appearing on the word registration screen (71) in response to the enter operation detector (15) detecting the enter operation.

The invention claimed is:

1. A word registration device, comprising a memory and a controller configured to perform operations comprising operations as:
   a character string selection detector configured to detect selection of a character string appearing on a screen of a display in accordance with an application program, the selection being performed with an operation with an input device;
   a registration operation detector configured to detect a registration operation performed with the input device in response to which the selected and detected character string is stored into a string storage area of the memory;
   a registration screen controller configured to, in response to the registration operation detector detecting the registration operation:
      cause a word registration screen to appear on the display, the word registration screen comprising a word input field for registering, to a dictionary, a word appearing in the word input field, a reading input field for accepting an input of a reading for the character string, and a speech part selection field for accepting a selection of a speech part of the character string, and
      cause the character string selected and detected by the character string selection detector and stored in the string storage area of the memory, to automatically appear as the word in the word input field on the display along with a reading input into the reading input field and the speech part selected in the speech part selection field;
   an enter operation detector configured to detect an enter operation performed with the input device on the word registration screen on which the character string selected and detected and stored in the string storage area of the memory, is caused to automatically appear on the display by the registration screen controller; and
   a word registration unit configured to register, to the dictionary, the character string automatically appearing as the word on the word registration screen in response to the enter operation detector detecting the enter operation.

2. The word registration device according to claim 1, wherein
   the input device includes a touchscreen panel attached to the screen of the display.

3. The word registration device according to claim 1, wherein
   operation as the registration operation detector comprises causing a request button for determining whether a word registration is to be performed to appear on the screen of the display in response to the character string selection detector detecting selection of the character string, and detects an input operation on the request button performed with the input device as the registration operation.

4. The word registration device according to claim 1, wherein
   operation as the registration screen controller comprises causing the word registration screen containing the character string selected and detected by the character string selection detector or a reading for the character string to appear on the display.

5. A word registration method implementable by a computer comprising a memory, the method comprising:
   detecting selection of a character string appearing on a screen of a display in accordance with an application program, the selection being performed with an operation with an input device in response to which the character string is stored into a string storage area of the memory;
   detecting a registration operation performed with the input device in response to which the selected and detected character string is stored into a string storage area of the memory;
   in response to the detecting the registration operation:
      causing a word registration screen to appear on the display, the word registration screen comprising a word input field for registering, to a dictionary, a word appearing in the word input field, a reading input field for accepting an input of a reading for the character string, and a speech part selection field for accepting a selection of a speech part of the character string; and
      causing the character string selected and detected to automatically appear as the word in the word input field along with a reading input into the reading input field and the speech part selected in the speech part selection field on the display;
   detecting an enter operation performed with the input device on the word registration screen on which the character string selected and detected and stored in the string storage area of the memory, is caused to automatically appear on the display; and
   registering, to the dictionary, the character string automatically appearing as the word on the word registration screen in response to the detection of enter operation.

6. A non-transitory computer-readable medium storing a word registration program, which when read and executed, causes a computer comprising a memory to perform operations comprising:
   detecting selection of a character string appearing on a screen of a display in accordance with an application program, the selection being performed with an operation with an input device in response to which the character string is stored into a string storage area of the memory;
   detecting a registration operation performed with the input device in response to which the selected and detected character string is stored into a string storage area of the memory;
   in response to the detecting the registration operation:
      causing a word registration screen to appear on the display, the word registration screen comprising a word input field for registering, to a dictionary, a word appearing in the word input field, a reading input field for accepting an input of a reading for the character string, and a speech part selection field for accepting a selection of a speech part of the character string; and
      causing the character string selected and detected to automatically appear as the word in the word input field along with a reading input into the reading input field and the speech part selected in the speech part selection field on the display;
   detecting an enter operation performed with the input device on the word registration screen on which the character string selected and detected and stored in the string storage area of the memory, is caused to automatically appear on the display; and registering, to the dictionary, the character string automatically appearing as the word on the word registration screen in response to the detection of enter operation.

7. The word registration device according to claim 2, wherein
operation as the registration operation detector comprises causing a request button for determining whether a word registration is to be performed to appear on the screen of the display in response to the character string selection detector detecting selection of the character string, and detects an input operation on the request button performed with the input device as the registration operation.

8. The word registration device according to claim 2, wherein
operation as the registration screen controller comprises causing the word registration screen containing the character string selected and detected by the character string selection detector or a reading for the character string to appear on the display.

9. The word registration device according to claim 3, wherein
operation as the registration screen controller comprises causing the word registration screen containing the character string selected and detected by the character string selection detector or a reading for the character string to appear on the display.

* * * * *